April 23, 1935.    F. C. MOCK    1,998,785
INTERNAL COMBUSTION ENGINE
Filed Jan. 11, 1932    2 Sheets-Sheet 1
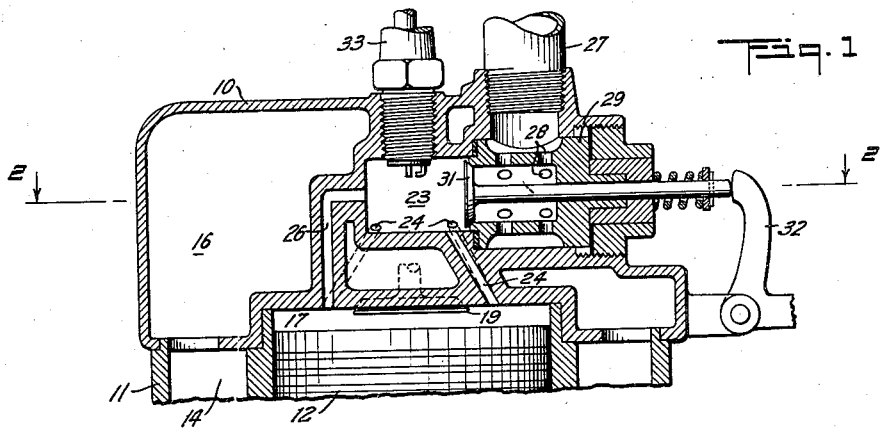
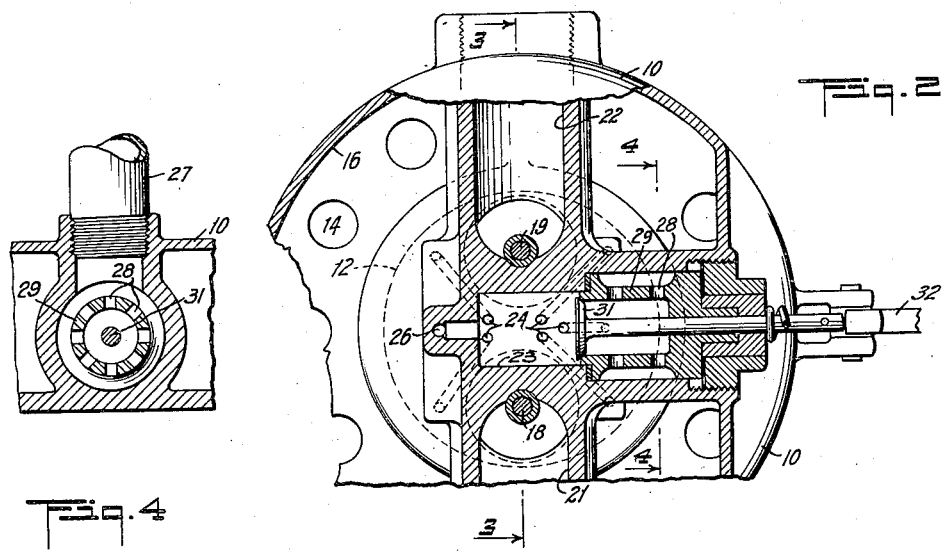
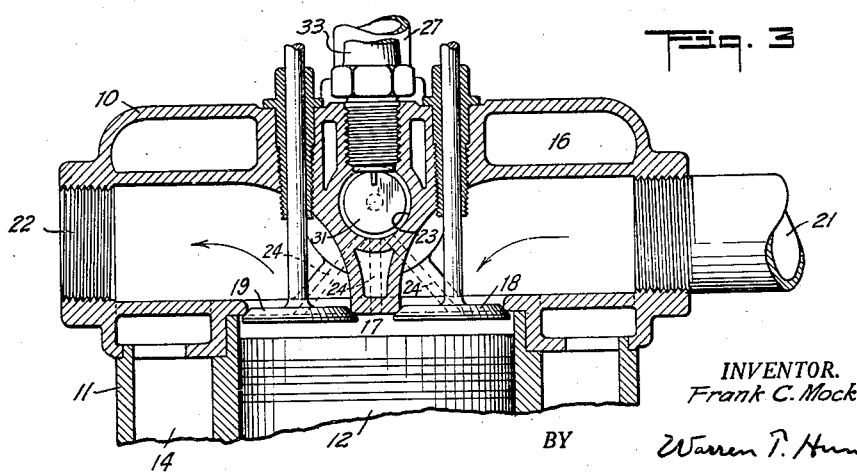
INVENTOR.
Frank C. Mock
BY Warren T. Hunt
ATTORNEY.

April 23, 1935.    F. C. MOCK    1,998,785
INTERNAL COMBUSTION ENGINE
Filed Jan. 11, 1932    2 Sheets-Sheet 2
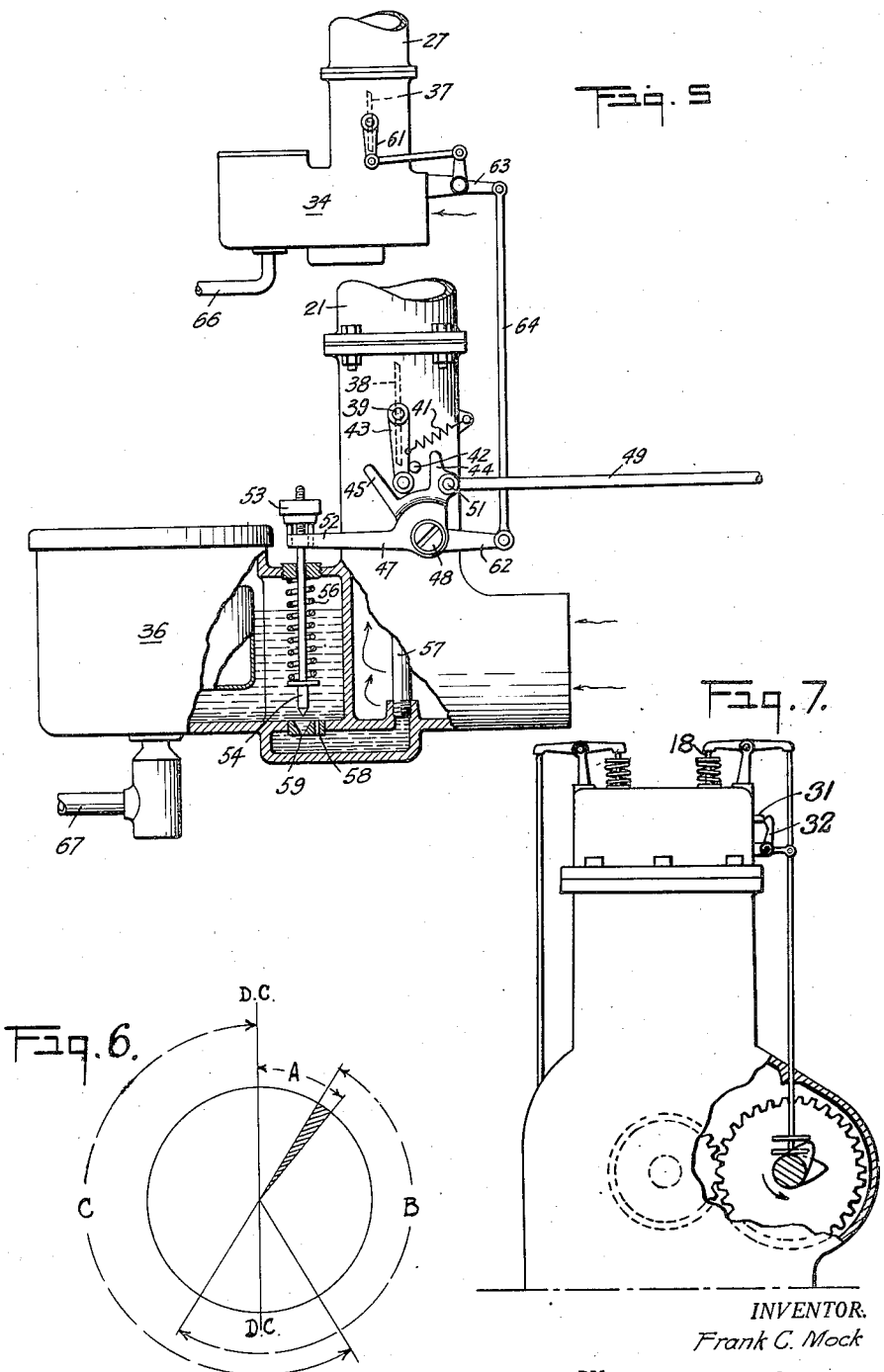
INVENTOR.
Frank C. Mock
BY Warren T. Hunt
ATTORNEY.

Patented Apr. 23, 1935

1,998,785

UNITED STATES PATENT OFFICE 1,998,785

INTERNAL COMBUSTION ENGINE

Frank C. Mock, Montclair, N. J., assignor, by mesne assignments, to Eclipse Aviation Corporation, East Orange, N. J., a corporation of New Jersey Application January 11, 1932, Serial No. 586,001

13 Claims. (Cl. 123—143)

This invention relates to engines, and more particularly to an improved means and method for controlling the combustion.

Internal combustion engines, and especially those of the separate ignition type, are subject to pressure wave disturbances commonly designated as detonation, which usually increases with an increase in the compression pressure or a decrease in fuel quality. Various expedients have been heretofore used to eliminate detonation with varying degrees of success. One of the methods used involves the use of a plurality of ignition devices, but it has been found difficult to synchronize the independent devices.

One of the objects of the present invention is to provide an internal combustion engine in which the charge is more efficiently ignited from a single ignition device.

Another object of the invention is to provide an internal combustion engine with a combustion chamber wherein the compression pressure may be raised without a corresponding increase in detonation.

Another object of the invention is to provide an internal combustion engine in which the fuel mixture ratio may be varied through a wide range.

Another object of the invention is to provide an internal combustion engine that will permit of the use of heavier fuels.

An important feature of the invention relates to the use of a preliminary combustion chamber from which flame is led through one or more restricted passages to the main combustion chamber.

Another feature of the invention relates to the selection of the flame passage size, whereby the flame is controlled but not extinguished.

Another feature relates to the use of separate intake passages between the chambers whereby the mixture ratio of both chambers may be separately controlled.

Other objects and features of the invention relating to improved mixture controls and the like will be apparent from the following description, in connection with which a preferred embodiment of the invention has been illustrated in the accompanying drawings, in which:

Fig. 1 is a vertical sectional view of a portion of an internal combustion engine constructed in accordance with the invention;

Fig. 2 is a sectional plan view taken on the line 2—2 of Fig. 1;

Fig. 3 is a vertical sectional view of a portion of the engine taken on the line 3—3 of Fig. 2;

Fig. 4 is a transverse sectional view taken on the lines 4—4 of Fig. 2;

Fig. 5 is a view of the carburetors and the inter-connecting means suggested for use in connection with the improved engine; and, Fig. 6 is a timing diagram illustrating the various cycles of the engine.

Fig. 7 is a front elevation of an engine with a portion of the timing gear cover broken away to show a cam arrangement for obtaining the valve timing shown in Fig. 6.

In the drawings, 10 is a removable cylinder head secured by any desired means to cylinder 11, within which is a reciprocating piston 12, the cylinder and head being provided with the usual water jacket spaces 14 and 16 respectively. The space 17 formed between the piston 12 and cylinder head 10 constitutes the main combustion chamber of the engine and is fed in the conventional manner through inlet valve 18 and exhausted through exhaust valve 19, which communicates with inlet manifold 21 and exhaust manifold 22 respectively. A second or preliminary chamber 23 is provided in head 10 which communicates with combustion chamber 17 through a plurality of restricted passages 24 and 26, each of which is of such size as to permit flame travel between chamber 23 and chamber 17 without extinguishing it, but at the same time to more or less isolate the preliminary chamber 23 from the main chamber 17. Passages one inch long and between $\frac{3}{32}"$ and $\frac{5}{32}"$ in diameter have been successfully used, but obviously other sizes may be used to suit individual conditions. The fuel mixture intake into chamber 23 is by means of pipe 27 and through holes 28 in removable sleeve 29 into the interior of the sleeve, from which it may enter the chamber 23 through intake valve 31, actuated by any desired means 32, having an operative connection with a movable part of the engine (not shown). A spark plug 33 is located in the preliminary combustion chamber 23 which is adapted to ignite the charge in the ordinary manner.

It is preferred to feed each of the combustion chambers by a separate carburetor, and to that end carburetor 34 is provided for feeding the preliminary chamber 23 through pipe 27, and a larger carburetor 36 is provided for feeding the main combustion chamber through pipe 21. Carburetor 34 is provided with a throttle valve 37, and carburetor 36 with a throttle valve 38 that are preferably inter-connected. Throttle valve 38 is preferably rigidly mounted on pivot pin 39 which carries a throttle lever 43, and urged to its open position by spring 41, the wide open position being determined by stop 42 against which throttle lever 43 is adapted to contact.

The lower end of throttle lever 43 is received by the spaced projections 44 and 45 of the bellcrank lever 47 that is pivotally mounted to the carburetor body at 48 and inter-connected to the operating rod 49 at 51. An extension 52 of lever 47 contacts the under side of adjustable nut 53 threaded upon the needle valve 54 that is normally urged downwardly by spring 56. The fuel from the carburetor enters the jet 57 by calibrated passage 58 and opening 59 that is adapted to be controlled by the tapered lower end of needle valve 54.

Throttle valve 37 has its operating lever 61 connected to the extension 62 of lever 47 by means of bellcrank 63 and rod 64, the arrangement being such that throttle valve 37 and throttle valve 38 are opened and closed respectively by the same direction of movement of rod 49.

In the operation of the engine, fuel is supplied to both carburetors through pipes 66 and 67 and the fuel is drawn through the respective jets by the suction of the engine in the usual manner. Carburetor 34 is preferably adjusted to deliver a mixture which may be easily ignited which ordinarily will contain a slightly greater amount of fuel than would ordinarily be used for best operation of an engine equipped with but a single carburetor.

The timing diagram of the engine, as illustrated in Fig. 6, is preferably selected whereby intake valve 31 is opened somewhat earlier than the main intake valve 18. The opening of intake valve 31 as shown in Fig. 6 occurs at dead center and continues throughout the range shown by the letter A or for some ten or fifteen degrees, depending on the intake diagram of the main valve shown by the letter B. Notwithstanding the main valve timing selected, it is preferred to keep valve 31 open for a short interval of time after the opening of the main inlet valve 18, the overlapping being illustrated in the diagram by the cross-hatched portion. The main charge is supplied through carburetor 36 and intake pipe 21, which are preferably separate and distinct from the carburetor and manifold supplying the preliminary combustion chamber.

In the main carburetor, the throttle valve 39 is constantly urged to the open position by spring 41 and, therefore, in the manipulation of the control rod 49, the throttle valve will remain open until the arm 44 contacts the lower end of the lever 43, but it will be noted that upon the initial movement of lever 47 in a counter clockwise direction, fuel valve 54 will move downwardly to reduce the fuel aperture 59 and after it has been closed, the extension 52 may move downwardly an additional amount with respect to the valve 54 and allow arm 44 to be further rotated to close the throttle valve 38. A reverse movement of rod 49 permits throttle 38 to be opened by spring 41 prior to the opening of valve 54, but if the throttle should stick, it will be positively opened by arm 45.

From the above description it may be seen that the mixture charge in preliminary chamber 23 is substantially constant in quality for all positions of control rod 49 and that the quality of the mixture delivered by carburetor 36 varies with the position of the control rod 49. The quantity of the mixture delivered by carburetor 34 is preferably controlled by throttle valve 37 that interconnects by rod 64 with control lever 62 of the main carburetor, but for limited ranges, by a proper selection of the size of carburetor 34, the volume control may be eliminated and both the quantity and quality of the mixture delivered by carburetor 34 may be kept constant at some predetermined amount.

Assuming the engine to be running, on the suction stroke of the piston 12, a comparatively rich mixture will be drawn into the preliminary chamber 23, and upon the ignition of the charge, the flame will be delivered to the main combustion chamber 17 through the restricted passages 24 and 26 in a manner to be evenly distributed throughout the area of the main combustion chamber and to efficiently ignite the mixture therein, even though the mixture may be comparatively lean. The size of the restricted passages is somewhat important, in that they should be large enough to permit the mixture to issue into the main combustion chamber in a flaming condition, whereby the main charge may be ignited simultaneously in a plurality of locations, which has been found to lessen the detonation.

As the mixture in preliminary chamber 23 is of constant quality and easily ignited, the control of the engine may be had by maintaining the air supply of the main charge constant and reducing the fuel supply. This means of control is not possible in a conventional engine, in that lean mixtures are hard to ignite and the mixture must be rich enough to establish ignition.

In the present engine, the introduction of the flaming mixture from the preliminary chamber into the main chamber will ignite a mixture that ordinarily is too lean to be used and, therefore, the quality control as shown in Fig. 5 may be used. In this form of control the main throttle valve 38 remains open during the initial movement of rod 49 toward the left and the output of the engine is gradually lessened by reducing the fuel orifice up to a predetermined point, after which the arm 44 contacts the lower end of lever 43 and closes throttle 38 in the ordinary manner.

While a preferred embodiment of the invention has been illustrated and described, it is understood that this showing and description are illustrative only and that various changes may be made without departing from the scope of the invention. For example, the inter-connection of the throttle valve of the two carburetors may be eliminated and other timing diagrams may be selected. Moreover, if desired, other inter-connections may be made between the throttle valve 39 and the control rod 49, either to reduce or increase the lost motion between them.

What is claimed is:

1. An internal combustion engine comprising a preliminary combustion chamber having a fuel mixture intake valve therein, a main combustion chamber, means forming a restricted passageway between the chambers, an inlet valve in the main chamber, and means for opening the preliminary chamber valve prior to the main chamber valve.

2. An internal combustion engine comprising a preliminary combustion chamber having a fuel mixture intake valve, a main combustion chamber, means for supplying a fuel mixture thereto, means forming a restricted passageway between the chambers, means for supplying the preliminary chamber with a richer mixture than the main chamber, a throttle control for the main chamber mixture and means associated with the throttle control for varying the air to fuel ratio of the main mixture.

3. An internal combustion engine comprising a preliminary combustion chamber having a fuel mixture intake valve, a main combustion chamber, means forming a restricted passageway between the chambers, a fuel mixture feed for each chamber, a control for the fuel supply fed to the main chamber, a throttle for the mixture feed to the main chamber and means operatively connecting said control and said throttle.

4. An internal combustion engine comprising a preliminary combustion chamber having a fuel mixture inlet valve, a main combustion chamber, said chambers having a plurality of interconnecting restricted passages terminating at spaced points in the main chamber, an inlet valve in the main chamber, and means for opening the preliminary chamber valve prior to the main chamber valve.

5. An internal combustion engine comprising a preliminary combustion chamber having a fuel mixture inlet valve, a main combustion chamber, said chambers having a plurality of interconnecting restricted passages terminating at spaced points in the main chamber, a fuel mixture feed for each chamber, a control for the fuel content of the mixture fed to the main chamber, a throttle for each mixture feed and said throttles and said control being operatively connected to a single manually operated member.

6. An internal combustion engine comprising a preliminary combustion chamber having a fuel mixture inlet valve, a main combustion chamber, means forming a plurality of restricted passages between the chambers, individual mixture conduits for each chamber, and means for varying the mixture proportions of the main chamber for controlling the speed of the engine, said mixture varying means including a device arranged to first reduce the amount of fuel to a predetermined value and subsequently to reduce the air supply.

7. An internal combustion engine comprising a preliminary combustion chamber having a fuel mixture inlet valve, a main combustion chamber, said chambers having a plurality of interconnecting restricted passages terminating at spaced points in the main chamber, an inlet valve in the main chamber, means for opening the preliminary chamber valve prior to the main chamber valve, and means for supplying the preliminary and main chambers from independent fuel mixture sources.

8. An internal combustion engine comprising a preliminary combustion chamber having a fuel mixture inlet valve, a main combustion chamber, said chambers having a plurality of interconnecting restricted passages terminating at spaced points in the main chamber, an inlet valve in the main chamber, means for opening the preliminary chamber valve prior to the main chamber valve, means for supplying the preliminary and main chambers from independent fuel mixture sources, and means for controlling the engine by varying the quality of mixture supplied to the main chamber.

9. The method of operating an internal combustion engine comprising preparing a comparatively rich mixture charge of substantially constant proportions, preparing a comparatively lean mixture charge, introducing the rich charge prior to the lean charge igniting the rich charge, leading the flaming rich charge to the lean charge for igniting the same, and controlling the engine speed by regulating the proportions and quantity of the lean mixture in a sequence such that engine speed is increased by first increasing the quantity of lean mixture and subsequently increasing its fuel content.

10. An internal combustion engine of the induction type comprising means for supplying a preliminary mixture charge of substantially constant fuel to air ratio, means for supplying a main mixture charge, control means for varying the quantity of the preliminary fuel charge, and control means including an overruning connection for varying the quantity and the fuel content of the main charge in sequence.

11. An internal combustion engine of the induction type comprising means for supplying a preliminary mixture charge of substantially constant fuel to air ratio, means for supplying a main mixture charge, control means for varying the quantity of the preliminary fuel charge, control means for varying the quantity and the fuel content of the main charge, and means for concurrently actuating the controls of both the preliminary and main charges.

12. An internal combustion engine of the induction type, a preliminary combustion chamber, a main combustion chamber, means forming restricted passageways between said chambers, an inlet valve for the preliminary chamber, fuel mixture supplying means for the preliminary chamber, an inlet valve for the main chamber, fuel mixture supplying means for the main chamber, means for opening the preliminary chamber inlet valve prior to the main chamber inlet valve, and interconnected control means for regulating both fuel mixture supplying means.

13. An internal combustion engine of the induction type, a preliminary combustion chamber, a main combustion chamber, means forming restricted passageways between said chambers, an inlet valve for the preliminary chamber, fuel mixture supplying means for the preliminary chamber, an inlet valve for the main chamber, fuel mixture supplying means for the main chamber, means for opening the preliminary chamber inlet valve prior to the main chamber inlet valve, and interconnected control means for regulating both fuel mixture supplying means, said control means for the main chamber including a mixture throttle valve and a fuel valve interconnected therewith through a lost motion connection.

FRANK C. MOCK.